May 3, 1966 R. J. LENNON Re. 26,013

HOSE NOZZLE

Original Filed May 18, 1962

INVENTOR.
ROBERT J. LENNON

BY Edward A. Sokolski

ATTORNEY

United States Patent Office

Re. 26,013
Reissued May 3, 1966

26,013
HOSE NOZZLE

Robert J. Lennon, Riverside, Calif., assignor to
Robert A. Gilmour, Somerset County, Pa.

Original No. 3,072,345, dated Jan. 8, 1963, Ser. No. 195,845, May 18, 1962. Application for reissue Nov. 8, 1963, Ser. No. 323,203
4 Claims. (Cl. 239—456)

Matter enclosed in heavy brackets [ ] appears in the original patent but forms no part of this reissue specification; matter printed in italics indicates the additions made by reissue.

This invention relates to a hose nozzle and more particularly to a hose nozzle in which the water flow can be controlled by a thumb actuator.

Hose nozzles of the prior art generally utilize a rotatable spray control, a control rod being slided relative to an aperture from which the spray is emitted as the outer body of the nozzle is rotated relative to an inner portion thereof. Such rotatably controlled nozzles have the disadvantage of requiring two hands to effect an adjustment. The rotatable member also tends to become difficult to rotate after even moderate periods of use, and with rotation thereof the hose coupling tends to become loosened as the spray is adjusted, resulting in leakage which is often quite discomforting to the operator.

To overcome some of these shortcomings, the pistol grip controlled nozzled was developed. Most pistol grip nozzles, however, require that the operator hold the grip against a biasing spring and the back pressure of the water stream in controlling the spray making it somewhat difficult to adjust the spray to the desired amount. In addition, most of these devices tend to develop leaks around the actuator parts.

The device of this invention overcomes the shortcomings of the prior art devices by providing a novel thumb actuated spray control. The spray control once positioned will maintain the spray at the desired point without further actuation by the operator. Little force is required to position the actuator in view of the fact that the spray control means is substantially isolated from the effects of the pressure of the water stream. The possibilities of nozzle leaks are minimized by effectively sealing off the actuator from the water flow and by eliminating the necessity for rotation of the nozzle in controlling the spray.

In the device of the invention, a hollow block is contained within the water conduit and fixedly attached thereto. The inner hollowed out portion of this block is maintained substantially in watertight relationship with the conduit. Control rod means for controlling the water flow from the conduit is slidably mounted inside the block and protrudes through an aperture at the end of the block into the conduit. The end of the control rod which protrudes from the block through a hole surrounded by an O ring is adapted to mate with the aperture formed in the end of the conduit from which the water is emitted. Actuator means which protrudes through the conduit and is located along the outer wall thereof is connected to the control rod within the block. This actuator means is used to slidably position the control rod relative to the aperture through which the water is emitted to regulate the spray. The actuator means is thus isolated from the water flow and the control rod is isolated from back water pressure by means of the watertight block in which they are fitted.

It is therefore an object of this invention to provide an improved hose nozzle.

It is a further object of this invention to provide a hose nozzle capable of thumb control in which the spray once adjusted will be maintained without the application of pressure to the control.

It is another object of this invention to provide an improved hose nozzle of simple construction which is not prone to leaking.

It is still a further object of this invention to facilitate the spray control of hose nozzles.

Other objects of the invention will become apparent from the following description taken in connection with the accompanying drawings of which—

Figure 1:
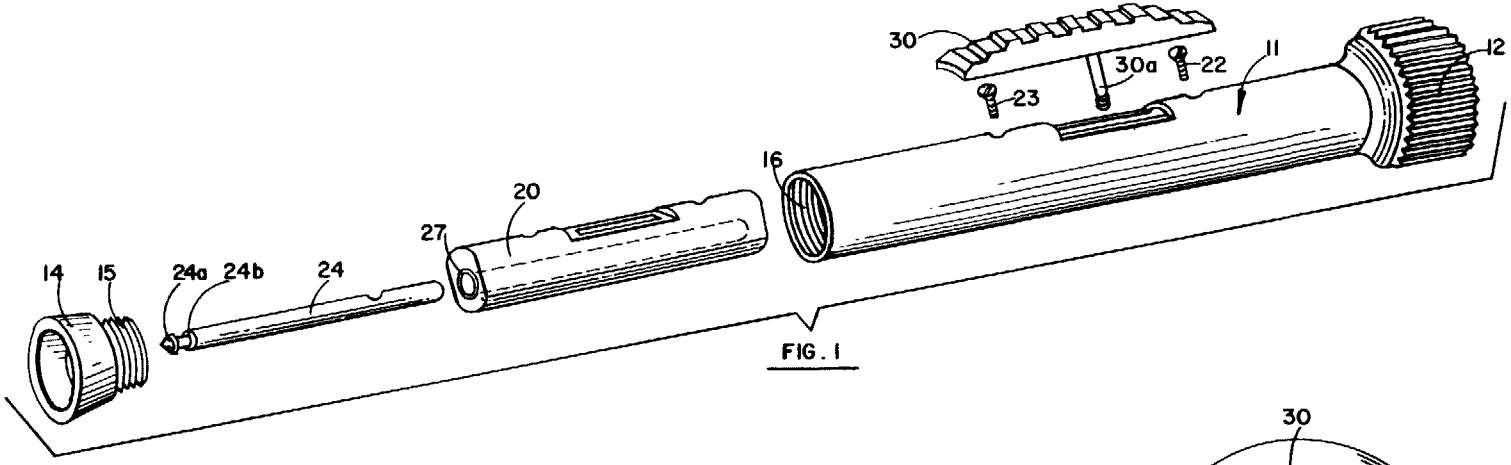
FIG. 1 is an exploded perspective view of a preferred embodiment of the device of the invention.
Figure 3:
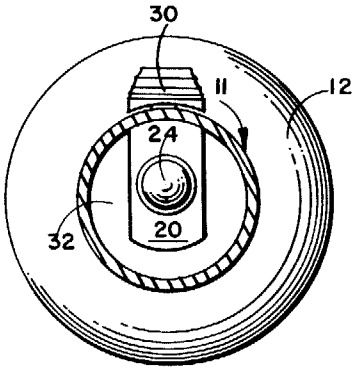
FIG. 3 is an enlarged cross-sectional view of the embodiment of FIG. 2 taken along the plane indicated by the line 3—3 in FIG. 2.
Figure 2:
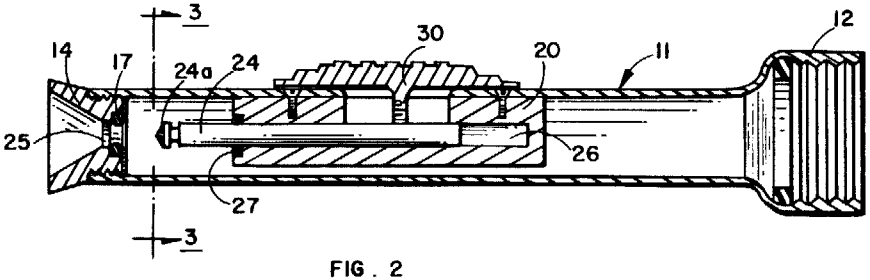
FIG. 2 is a cross-sectional view of the embodiment shown in FIG. 1.

Referring to the various figures, conduit 11 which forms the main body of the nozzle has one end thereof 12 adapted for threadable attachment to a hose fitting. Conduit 11 has a spray diffuser 14 removably attached to the other end thereof from which the spray is emitted. Spray diffuser 14 may be threadably attached to the main portion of the conduit by means of mating threads 15 and 16 or may be attached by other suitable means such as, for example, a press fit design. Fitted in a recess formed in the spray diffuser is an O ring 17. The spray diffuser should be removable from the main body of the conduit to permit replacement of O ring 17 when necessary.

Contained within conduit 11 and fixedly attached thereto is a block 20. Block 20 may be fixedly attached to the inner wall of conduit 11 by means of screws 22 and 23 or other suitable means. Block 20 may also be integrally formed with conduit 11 by means of a casting process. The latter means of fabrication may be found to be more economical. Slidably mounted in a channel 26 formed in block 20 is control rod 24. Control rod 24 is supported for motion along an axis passing substantially through the center of aperture 25 in the end of the diffuser 14 which forms the end of the conduit. Block 20 has an aperture formed in one end thereof through which rod 24 passes. An O ring 27 is fitted in a groove in the block at the end in which the aperture is formed. The shoulder portion 24b of the rod is adapted to mate with the end of the conduit surrounding aperture 25 to seal off this aperture when it abuts against O ring 17. Diffusion of the spray is effected by tip portion 24a of the rod.

A thumb actuator 30 for slidably positioning rod 24 in channel 26 is attached to rod 24 by means of a coupling shaft 30a which is fixedly attached to the rod, for example by mating threads or a press fit.

The inner portion of block 20 is maintained in watertight relationship with the inside of conduit 11, the only possible leakage path therebetween being sealed off by means of the sealing abutment of the wall of rod 24 against O ring 27. Thus, there is no means by which water may enter block 20 and therefore no leakage can occur around the edges of thumb actuator 30.

In the device of the invention, the water stream flows from the end 12 of the conduit through passageway 32 formed between the walls of the block and the conduit to the diffuser end of the conduit from which it is emitted. The spray is varied in accordance with the position of control rod 24 relative to aperture 25, the stream being completely cut off when the shoulder portion 24b of this rod is in abutment against O ring 17. In view of the fact that there is no significant back pressure of the water stream acting on control rod 24, this rod will hold any position it is slided to by means of actuator 30 without the operator having to hold the actuator.

If so desired, block 20 may be fabricated so that it can be press fitted into the conduit. This can be accomplished, for example, by making the block broader so that the top and bottom walls thereof abut against the conduit walls in a press fit. Passageway 32 then would be split into opposite portions formed between the vertical walls of the block and the conduit.

In place of actuator 30, an actuator which is pivotally supported on conduit 11 may be used with slidable motion of rod 24 being achieved by as the operator pivots the actuator with his thumb.

Although the invention has been described and illustrated in detail, it is to be clearly understood that the same is by way of illustration and example only and is not to be taken by way of limitation, the spirit and scope of this invention being limited only by the terms of the appended claims.

I claim:

[1. In a hose nozzle having a conduit with one end thereof adapted for connection to a hose fitting and the other end forming a spray diffuser, a block contained within said conduit and fixedly attached thereto, said block having a longitudinal channel formed therein, a control rod slidably mounted in said channel and protruding from said block into said conduit, means for maintaining the inner portion of said block in substantially watertight relationship with said conduit, and actuator means connected to said rod for slidably positioning said rod relative to said diffuser.]

[2. A hose nozzle comprising a hollow cylindrical conduit, a hollow block contained within said conduit and fixedly attached to the inner wall thereof, said nozzle having a communicating passage connecting the two ends thereof formed between the inner wall of said conduit and the outer wall of said block, control rod means for controlling the water flow from said nozzle, said block having an aperture formed therein, said rod means being slidably mounted in said block, said rod means protruding through said block aperture, means for maintaining the inner position of said block in substantially watertight relationship with said conduit, and actuator means connected to said rod means for slidably positioning said rod.]

[3. In a hose nozzle, a hollow cylindrical conduit, a hollow block contained with said conduit and fixedly attached thereto, the inner portion of said block being in watertight relationship with said conduit, a passageway being formed between said conduit and said block walls for connecting said conduit ends, control rod means for controlling the water flow from said nozzle, said control rod means being slidably mounted in said block and protruding from said block into said conduit, one end of said rod means being adapted to mate with one end of said conduit in sealing engagement therewith, and actuator means connected to said rod for slidably positioning said rod.]

[4. A hose nozzle comprising a conduit, said conduit being adapted at one end thereof for connection to a hose, a hollow block contained within said conduit and fixedly attached to the inner wall thereof, the end of said conduit opposite said one end thereof having an outlet aperture formed therein, said nozzle having a communicating passage connecting said two ends thereof, said passage being formed between the inner wall of said conduit and the outer wall of said block, control rod means for controlling the water flow from said nozzle, said block having an aperture formed therein opposite said conduit outlet aperture, said rod means being slidably mounted in said block for motion along an axis passing substantially through the center of said outlet aperture formed in said conduit, said rod means protruding through said block aperture, means for maintaining the inner portion of said block in substantially watertight relationship with said conduit, and actuator means connected to said rod for slidably positioning said rod along said axis.]

[5. The device as recited in claim 4 wherein said watertight maintaining means comprises an O ring seal mounted in said block in the portion thereof surrounding said aperture formed therein, said O ring seal resiliently abutting against said rod means.]

[6. In a hose nozzle, a conduit having one end thereof adapted for connection to a hose and the opposite end thereof having an outlet aperture formed therein, a hollow block contained within said conduit and fixedly attached thereto, the inner portion of said block being in watertight relationship with said conduit, a passageway being formed between said conduit and said block for connecting said conduit ends, control rod means for controlling the water flow from said aperture, said control rod means being slidably mounted in said block for motion along an axis passing substantially through the center of said conduit aperture and protruding from said block into said conduit, one end portion of said rod means being adapted to mate with the end of said conduit in which said outlet aperture is formed to seal said aperture, and actuator means connected to said rod for slidably positioning said rod along said axis relative to said aperture.]

*7. In a hose nozzle having a water conduit with one end thereof adapted for connection to a hose fitting and the other end forming a spray diffuser,*

*a control rod within said water conduit, said control rod being longitudinally movable and having an end portion cooperable with said spray diffuser to stop and vary the spray issuing therefrom in accordance with the relative position of said end portion with respect to said spray diffuser,*

*manually movable actuator means disposed outside said water conduit and connected to said control rod for slidably positioning said control rod in either direction relative to said diffuser,*

*positioning and control means for retaining said control rod in any of its longitudinal positions upon release of said actuator means by the operator and for substantially preventing movement of said control rod under the action of the water stream in said conduit by isolating said control rod from the effects of the pressure of the water stream, said means including a fixed mounting block contained within said conduit intermediate the ends thereof and projecting from a wall thereof, said block having a forward end nearest said diffuser and a longitudinal passageway formed part way thereinto from said forward end and terminating short of the other end, said control rod being slidably mounted in said passageway and protruding from said block into said conduit, said block and said conduit having a longitudinally elongated slot therein extending transversely of said conduit from the outside of said conduit to said passageway, said actuator means including a member residing in said slot and having an inner end connected to said control rod and an*

*outer end terminating outside said conduit for manual actuation, annular sealing means between said control rod and said passageway for maintaining the inner portion of said block in substantially watertight relationship with said conduit, said control rod being of uniform cross sectional configuration between said end portion and said annular sealing means whereby said control rod once positioned by the operator will remain in that position without further actuation by the operator.*

*8. The device as claimed in claim 7 wherein said water conduit is defined by a generally cylindrical wall and wherein said spray diffuser is defined by a separate element axially aligned with said generally cylindrical wall and removably connected to said other end of said conduit.*

*9. The device as claimed in claim 7 wherein said conduit is straight, said ends being in axial alignment with each other, and wherein said actuator means further includes a thumb-actuated element connected to said member and disposed exteriorly of said conduit in longitudinally sliding engagement with said conduit, said thumb-actuated element covering the entire outer end of said slot.*

*10. In a hose nozzle,*

*a wall defining a straight tubular water conduit having an inlet end adapted for connection to a hose fitting and an axially aligned outlet end forming a spray diffuser,*

*a fixed mounting block contained within said conduit intermediate the ends thereof and projecting inwardly from said wall, said block having a longitudinal passageway formed part way thereinto from the end nearest said diffuser and terminating short of the other end, said passageway being coaxially aligned with said diffuser, said block and said wall having a longitudinally elongated transverse slot connecting said passageway with the outside of said wall for receiving manually operated actuator means,*

*a longitudinally movable control rod carried in said passageway in said mounting block and protruding from said passageway toward said spray diffuser,*

*said control rod having an end portion cooperable with said spray diffuser to stop and vary the spray issuing therefrom in accordance with the relative position of said end portion with respect to said spray diffuser,*

*annular sealing means between said control rod and said passageway for maintaining said passageway and said slot in watertight relationship with said conduit,*

*actuating means residing at least partially in said transverse slot in said wall and said block and being longitudinally slidable in said slot, said actuating means having an inner end secured to said control rod and an outer end terminating outside said conduit for manual manipulation longitudinally within said slot whereby longitudinal adjustment of said control rod may be effected manually, said outer end defining a thumb-actuated element slidably engaging the exterior of said wall and covering the outer end of said slot.*

References Cited by the Examiner

The following references, cited by the Examiner, are of record in the patented file of this patent or the original patent.

UNITED STATES PATENTS

| | | | |
|---|---|---|---|
| 502,742 | 8/1893 | McGowen. | |
| 553,999 | 2/1896 | Nicholsburg | 239—456 |
| 801,210 | 10/1905 | Burnett | 239—456 |
| 930,444 | 8/1909 | Warren | 239—459 |
| 1,428,530 | 9/1922 | Cassidy | 251—319 |
| 1,631,167 | 6/1927 | Tereau | 239—456 |
| 1,778,223 | 10/1930 | Meng | 239—459 |
| 2,677,525 | 5/1954 | Pavey et al. | 239—583 |
| 2,695,069 | 11/1954 | Boerner | 239—456 |
| 2,991,945 | 7/1961 | Rosenkranz. | |
| 3,006,560 | 10/1961 | Rosenkranz | 239—556 |

EVERETT W. KIRBY, *Primary Examiner.*

D. L. MOSELEY, *Assistant Examiner.*